United States Patent
Chen

(10) Patent No.: US 10,004,054 B2
(45) Date of Patent: Jun. 19, 2018

(54) METHOD OF MAKING MOBILE ORIGINATED CALLS USING USER EQUIPMENT IN IOPS DUAL PLMN MODE OF OPERATION

(71) Applicant: ACER INCORPORATED, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days. days.

(21) Appl. No.: 15/186,551

(22) Filed: Jun. 20, 2016

(65) Prior Publication Data

US 2017/0013583 A1    Jan. 12, 2017

Related U.S. Application Data

(60) Provisional application No. 62/190,272, filed on Jul. 9, 2015.

(51) Int. Cl.
  *H04W 4/00* (2018.01)
  *H04W 60/00* (2009.01)
  (Continued)

(52) U.S. Cl.
  CPC .......... *H04W 60/005* (2013.01); *H04W 48/18* (2013.01); *H04W 76/027* (2013.01);
  (Continued)

(58) Field of Classification Search
  CPC . H04W 88/06; H04W 36/14; H04W 36/0022; H04W 60/00; H04W 48/18;
  (Continued)

(56) References Cited

U.S. PATENT DOCUMENTS

| | | | |
|---|---|---|---|
| 7,925,690 B2 * | 4/2011 | Smith | H04M 1/274583 455/405 |
| 2004/0185850 A1 * | 9/2004 | Ikeda | H04W 48/18 455/435.3 |

(Continued)

OTHER PUBLICATIONS

3rd Generation Partnership Project; Technical Specification Group Services and System Aspects; Study on architecture enhancements to support isolated Evolved Universal Terrestrial Radio Access Network (E-UTRAN) operation for public safety (Release 13), 3GPP TR 23.797 V13.0.0, Jun. 2015, pp. 1-12, XP050986016, 3GPP.

(Continued)

*Primary Examiner* — Nimesh Patel

(74) *Attorney, Agent, or Firm* — Winston Hsu

(57) ABSTRACT

In a wireless communication system, an IOPS-capable user equipment is registered on both a normal PLMN and an IOPS PLMN. The user equipment is configured to set one of the first PLMN and the second PLMN as a primary PLMN and the other one of the first PLMN and the second PLMN as a secondary PLMN randomly, according to an MO PLMN preference provided by a user of the user equipment, or according to a dialing history of the user equipment. Therefore, PLMN precedence can be provided for the user equipment in the IOPS dual PLMN mode of operation to make MO calls.

3 Claims, 7 Drawing Sheets

(51) Int. Cl.
  *H04W 48/18* (2009.01)
  *H04W 76/02* (2009.01)
  *H04M 1/725* (2006.01)
  *H04W 76/00* (2018.01)
  *H04W 88/06* (2009.01)
  *H04W 92/14* (2009.01)
  *H04W 84/04* (2009.01)
(52) U.S. Cl.
  CPC ........ *H04W 76/18* (2018.02); *H04M 1/72519* (2013.01); *H04W 76/007* (2013.01); *H04W 76/50* (2018.02); *H04W 84/042* (2013.01); *H04W 88/06* (2013.01); *H04W 92/14* (2013.01)
(58) Field of Classification Search
  CPC ............... H04W 84/042; H04W 92/02; H04W 36/0066; H04W 40/00; H04W 8/12; H04W 8/06; H04W 88/16; H04W 76/02; H04W 28/08; H04W 4/16; H04W 28/0289; H04W 36/12; H04W 36/24; H04W 40/20; H04W 8/183; H04M 2207/18; H04M 7/006; H04M 1/72547; H04M 15/8038; H04M 1/72519; H04M 2207/20; H04M 3/465; H04M 2250/60; H04M 1/274583; H04M 15/58; H04M 2203/652; H04M 1/6075; H04M 2201/40; H04M 3/42204; H04M 1/04; H04M 1/2473; H04M 1/274575; H04M 1/6058; H04M 1/6066; H04M 1/725
  See application file for complete search history.

(56) References Cited

U.S. PATENT DOCUMENTS

| | | | |
|---|---|---|---|
| 2006/0045069 A1* | 3/2006 | Zehavi | ............... H04L 12/5692 370/352 |
| 2009/0054061 A1 | 2/2009 | Dawson | |
| 2009/0061870 A1* | 3/2009 | Finkelstein | ........... H04W 48/20 455/435.2 |
| 2009/0061932 A1* | 3/2009 | Nagarajan | ............... H04W 8/18 455/558 |
| 2009/0312020 A1* | 12/2009 | Lee | ..................... H04W 60/005 455/435.2 |
| 2010/0323670 A1* | 12/2010 | Kaida | ............. H04M 1/274566 455/414.1 |
| 2014/0228039 A1* | 8/2014 | Zhao | .................... H04B 1/3816 455/450 |
| 2016/0205550 A1* | 7/2016 | Rajadurai | ............. H04W 48/12 455/411 |
| 2017/0006536 A1* | 1/2017 | Baek | ..................... H04W 4/005 |

OTHER PUBLICATIONS

Samsung et al, IOPS solution for backhaul-less scenario, SA WG2 Meeting #107, Jan. 26-30, 2015, pp. 1-7, SA WG2 Temporary Document, S2-150346, (revision of S2-15xxxx), XP050942317, Sorrento, Italy.

Samsung, Way forward on IOPS solution for the backhaul-less scenarios, 0SA WG2 Meeting #107, Jan. 26-30, 2015, pp. 1-4, SA WG2 Temporary Document, S2-150349, (revision of S2-15xxxx), XP050942320, Sorrento, Italy.

3rd Generation Partnership Project; Technical Specification Group Services and System Aspects; Study on Isolated Evolved Universal Terrestrial Radio Access Network (E-UTRAN) Operation for Public Safety; Security aspects (Release 13), 3GPP TR 33.997 V0.1.0, May 2015, pp. 1-18, XP050967496, 3GPP.

* cited by examiner

METHOD OF MAKING MOBILE ORIGINATED CALLS USING USER EQUIPMENT IN IOPS DUAL PLMN MODE OF OPERATION

CROSS REFERENCE TO RELATED APPLICATIONS

This application claims priority of U.S. Provisional Application No. 62/190,272 filed on 2015 Jul. 9.

BACKGROUND OF THE INVENTION

1. Field of the Invention

The present invention is related to a method of making an MO call using a user equipment in an IOPS dual PLMN mode of operation, and more particularly, to a method of making an MO call using a user equipment in an IOPS dual PLMN mode of operation by provide PLMN precedence.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple Node-Bs (NBs) for communicating with multiple user equipment (UE). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network (CN) which includes a mobility management entity (MME), a serving gateway (SGW) and other devices for non-access stratum (NAS) control.

In 3GPP Release 13, a study item was studied on isolated E-UTRAN operations for public safety (IOPS) in support of mission critical network operation for public safety (PS). The main idea laid behind this IOPS study item is to investigate needs and requirements for E-UTRAN operations when encountering connection problems with the macro evolved packet core (EPC).

For the scenario that an eNB has no backhaul to the macro EPC, the general IOPS architectural requirements include:

(a) When a UE accesses the eNB in an IOPS mode of operation, a local IP connectivity and transport public safety service shall be provided to the UE by a local EPC connected to the eNB, if authorized.

(b) An eNB that supports IOPS may enter the IOPS mode of operation after it detects lack of S1 connectivity to the macro EPC. The decision by an eNB to enter the IOPS mode of operation shall be made in accordance with the local policies of the radio access network (RAN) operator.

According to related 3GPP document, the macro EPC is the EPC which serves an eNB in normal mode of operation, while the local EPC is an entity which provides functionality used by an eNB in IOPS mode of operation in order to support public safety services. A nomadic eNB (NeNB) is a nomadic cell which may include a base station, antennas, microwave backhaul and support for local services. The NeNB is intended for PS use by providing coverage or additional capacity where coverage was never present (e.g. forest fire or underground rescue) or where coverage is no longer present (e.g. due to natural disaster). An isolated E-UTRAN can be created by either an E-UTRAN without normal connectivity with the macro EPC or deployed NeNBs with E-UTRAN functionality provided by a local EPC.

FIG. 1 is a diagram illustrating an IOPS architecture of an E-UTRAN 100 in response to an outage event within the network. An isolated E-UTRAN 100A can be created from the E-UTRAN 100 following an event which isolates a part of the E-UTRAN 100 from normal connectivity with the macro EPC or following deployment of standalone E-UTRAN NeNBs within a part of the E-UTRAN 100. The isolated E-UTRAN 100A may include (1) operation with no connection to the macro EPC; (2) one or multiple eNBs; (3) interconnection between eNBs; (4) limited backhaul capacity to the macro EPC; and (5) the services required to support local operations (e.g. group communication) in the case of no network coverage or of limited network coverage.

Referring to FIG. 1, the isolated E-UTRAN 100A can be created when the outage event has been occurred within the wireless communication system. The eNBs in the normal-mode E-UTRAN 100B are connected to the macro EPC by backhaul connection and the macro EPC is connected to the application server. When the isolated E-UTRAN 100A is created, the eNBs in the isolated E-UTRAN 100A are able to support services required for local operations even though a connection to the normal mode E-UTRAN 100A, as well as to the macro EPC, has been cut off.

FIG. 2 is a diagram illustrating UE behavior in an IOPS-capable wireless communication system. For illustrative purpose, it is assumed that a coverage area 20A is served by an IOPS-mode eNB1 (i.e., isolated from the macro EPC) and a coverage area 20B is served by a normal-mode eNB2 (i.e., connected to the macro EPC). PS UE0~UE5 represent IOPS-capable mobile devices which can support a PS band. The PS UE1~UE3 may be served by one or multiple cells in the IOPS-mode eNB1 and get connected to each other if the IOPS operation allows it. The PS UE4~UE5 may be served by one or multiple cells in the normal-mode eNB2 and get connected to each other. The PS UE0 is under the coverage of both the IOPS-mode eNB1 and the normal-mode eNB2.

In an IOPS dual PLMN mode of operation, the PS UE0 is configured to register on both a PLMN of the IOPS-mode eNB1 and a PLMN of the normal-mode eNB2. Therefore, the PS UE0 is able to receive mobile terminated (MT) calls from any of the PS UE0-UE5. However, there is a need for a method of making mobile originated (MO) calls using a user equipment which is registered on both a normal PLMN and an IOPS PLMN.

SUMMARY OF THE INVENTION

The present invention provides a method of making an MO call using a user equipment in an IOPS dual PLMN mode of operation. The method includes the user equipment registering on both a first PLMN and a second PLMN, wherein the first PLMN is connected to a macro EPC and the second PLMN is isolated from the macro EPC; the user equipment setting one of the first PLMN and the second PLMN as a primary PLMN and an other one of the first PLMN and the second PLMN as a secondary PLMN randomly, according to a PLMN preference provided by a user of the user equipment, or according to a dialing history of the user equipment; and the user equipment making a first communication attempt by dialing the MO call via the primary PLMN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
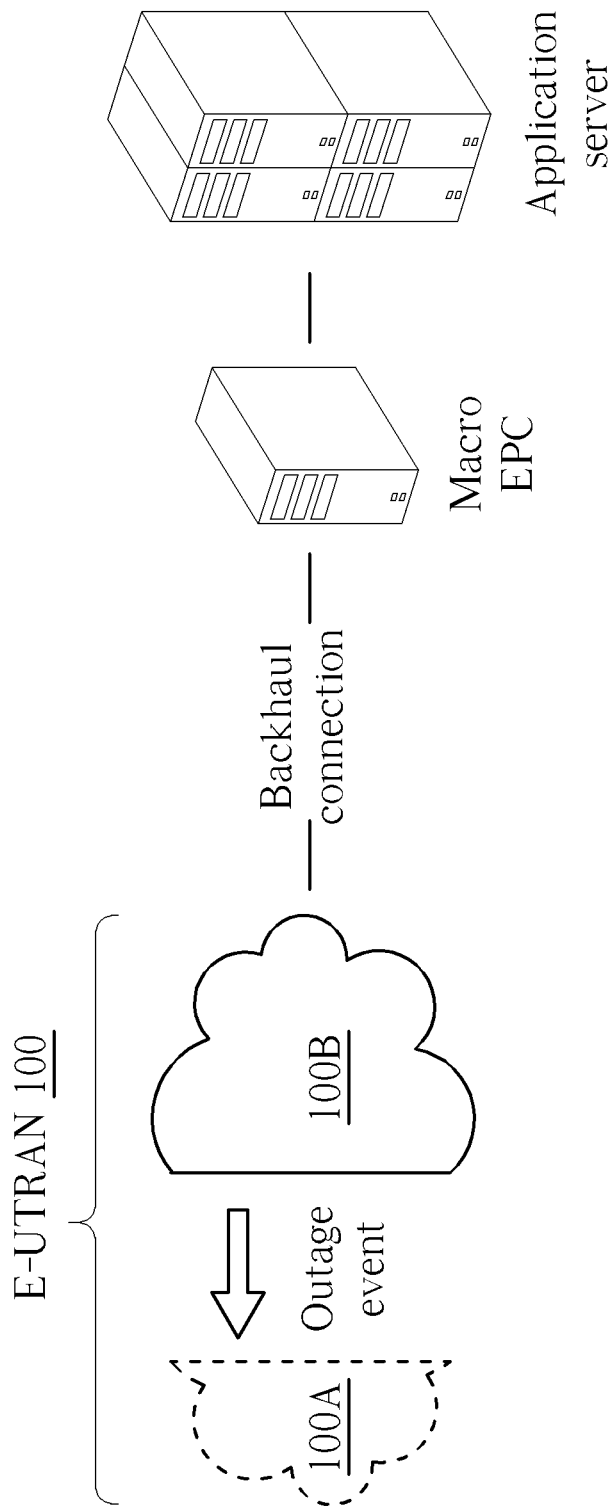
FIG. 1 is a diagram illustrating an IPSO architecture of an E-UTRAN in response to an outage event within the network.
Figure 2:
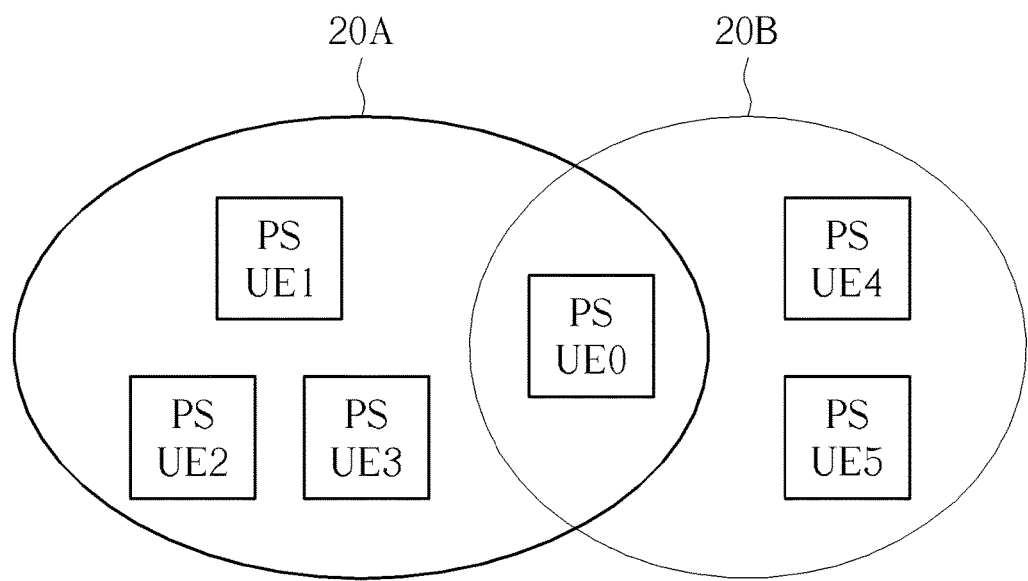
FIG. 2 is a diagram illustrating UE behavior in an IOPS-capable wireless communication system.
Figure 3:
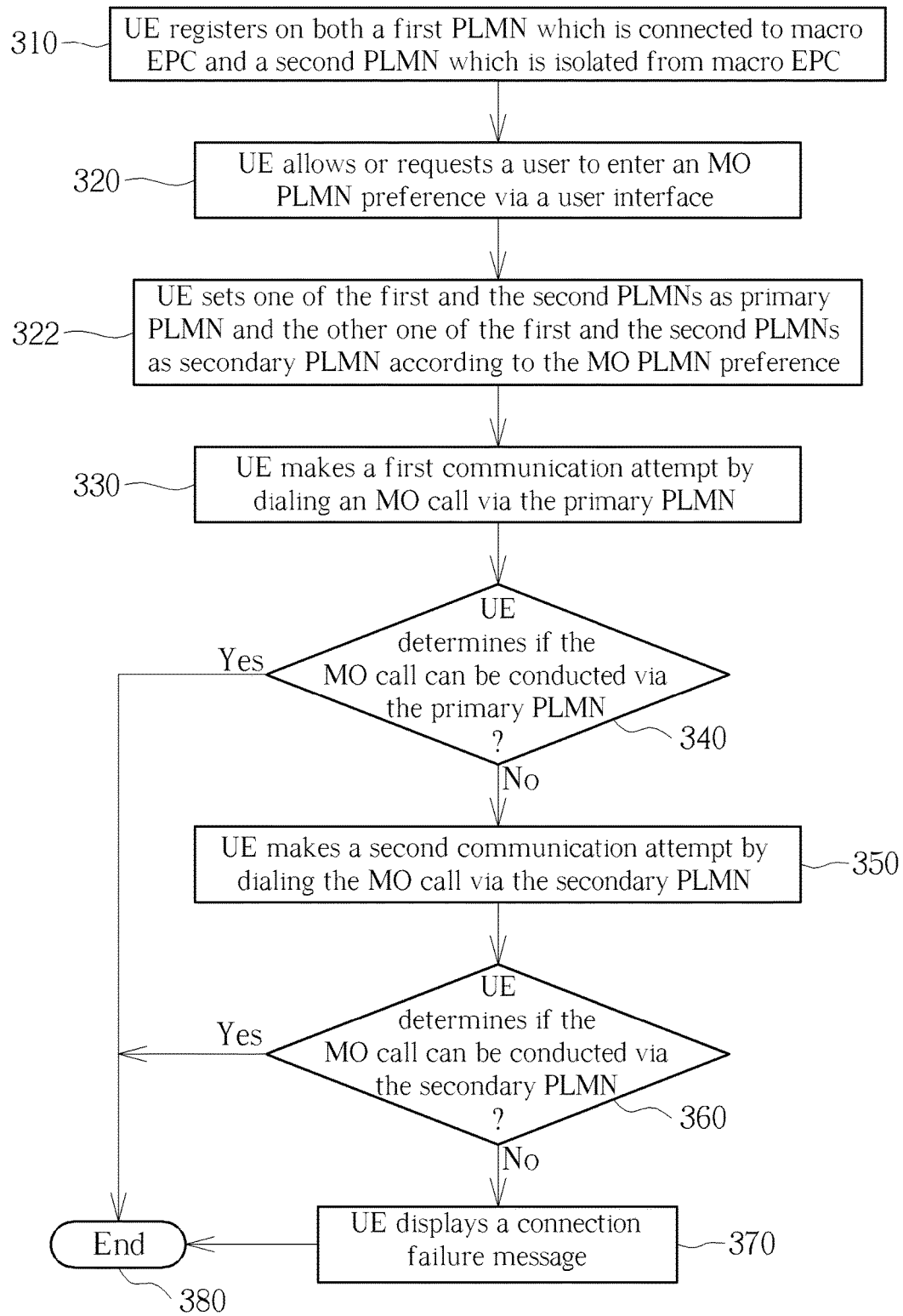
FIG. 3 is a flowchart illustrating a method of making an MO callusing a user equipment which operates in the IOPS dual PLMN mode according to an embodiment of the present invention.

FIG. 3 is a flowchart illustrating a method of making an MO callusing a user equipment which operates in the IOPS dual PLMN mode according to an embodiment of the present invention. The embodiment depicted in FIG. 3 includes the following steps:

Step 310: the user equipment registers on both a first PLMN which is connected to a macro EPC and a second PLMN which is isolated from the macro EPC; execute step 320.

Step 320: the user equipment allows or requests a user to enter an MO PLMN preference via a user interface; execute step 330.

Step 322: the user equipment sets one of the first and the second PLMNs as a primary PLMN and the other one of the first and the second PLMNs as a secondary PLMN according to the MO PLMN preference; execute step 340.

Step 330: the user equipment makes a first communication attempt by dialing an MO call via the primary PLMN; execute step 340.

Step 340: the user equipment determines if the MO call can be conducted via the primary PLMN; if yes, execute step 380; if no, execute step 350.

Step 350: the user equipment makes a second communication attempt by dialing the MO call via the secondary PLMN; execute step 360.

Step 360: the user equipment determines if the MO call can be conducted via the secondary PLMN; if yes, execute step 380; if no, execute step 370.

Step 370: the user equipment displays a connection failure message; execute step 380.

Step 380: end.

Figure 4:
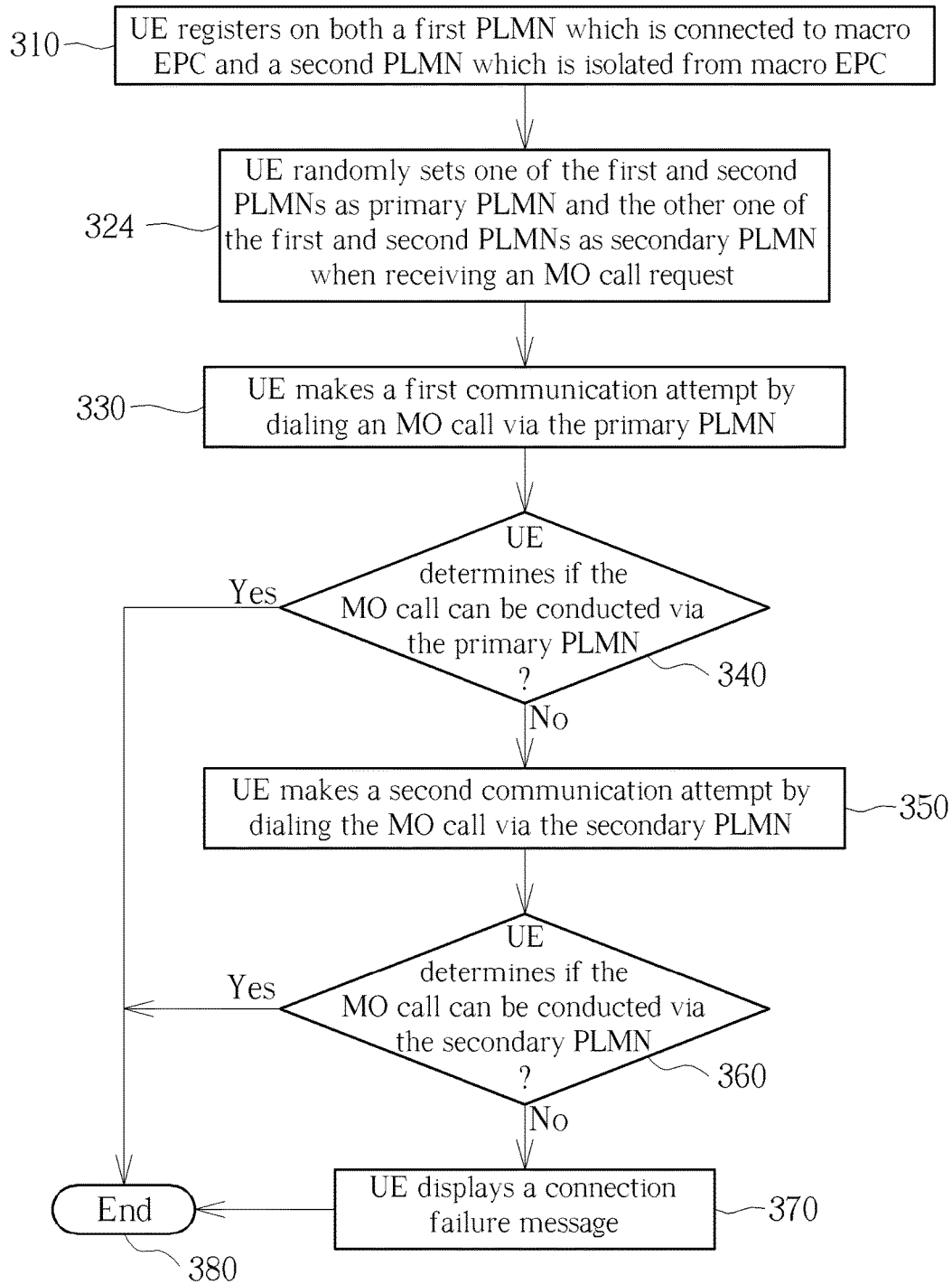
FIG. 4 is a flowchart illustrating a method of making an MO callusing a user equipment which operates in the IOPS dual PLMN mode according to another embodiment of the present invention.

FIG. 4 is a flowchart illustrating a method of making an MO callusing a user equipment which operates in the IOPS dual PLMN mode according to another embodiment of the present invention. The embodiment depicted in FIG. 4 includes the following steps:

Step 310: the user equipment registers on both a first PLMN which is connected to a macro EPC and a second PLMN which is isolated from the macro EPC; execute step 324.

Step 324: the user equipment randomly sets one of the first and second PLMNs as a primary PLMN and the other one of the first and second PLMNs as a secondary PLMN when receiving an MO call request; execute step 330.

Step 330: the user equipment makes a first communication attempt by dialing an MO call via the primary PLMN; execute step 340.

Step 340: the user equipment determines if the MO call can be conducted via the primary PLMN; if yes, execute step 380; if no, execute step 350.

Step 350: the user equipment makes a second communication attempt by dialing the MO call via the secondary PLMN; execute step 360.

Step 360: the user equipment determines if the MO call can be conducted via the secondary PLMN; if yes, execute step 380; if no, execute step 370.

Step 370: the user equipment displays a connection failure message; execute step 380.

Step 380: end.

Figure 5:
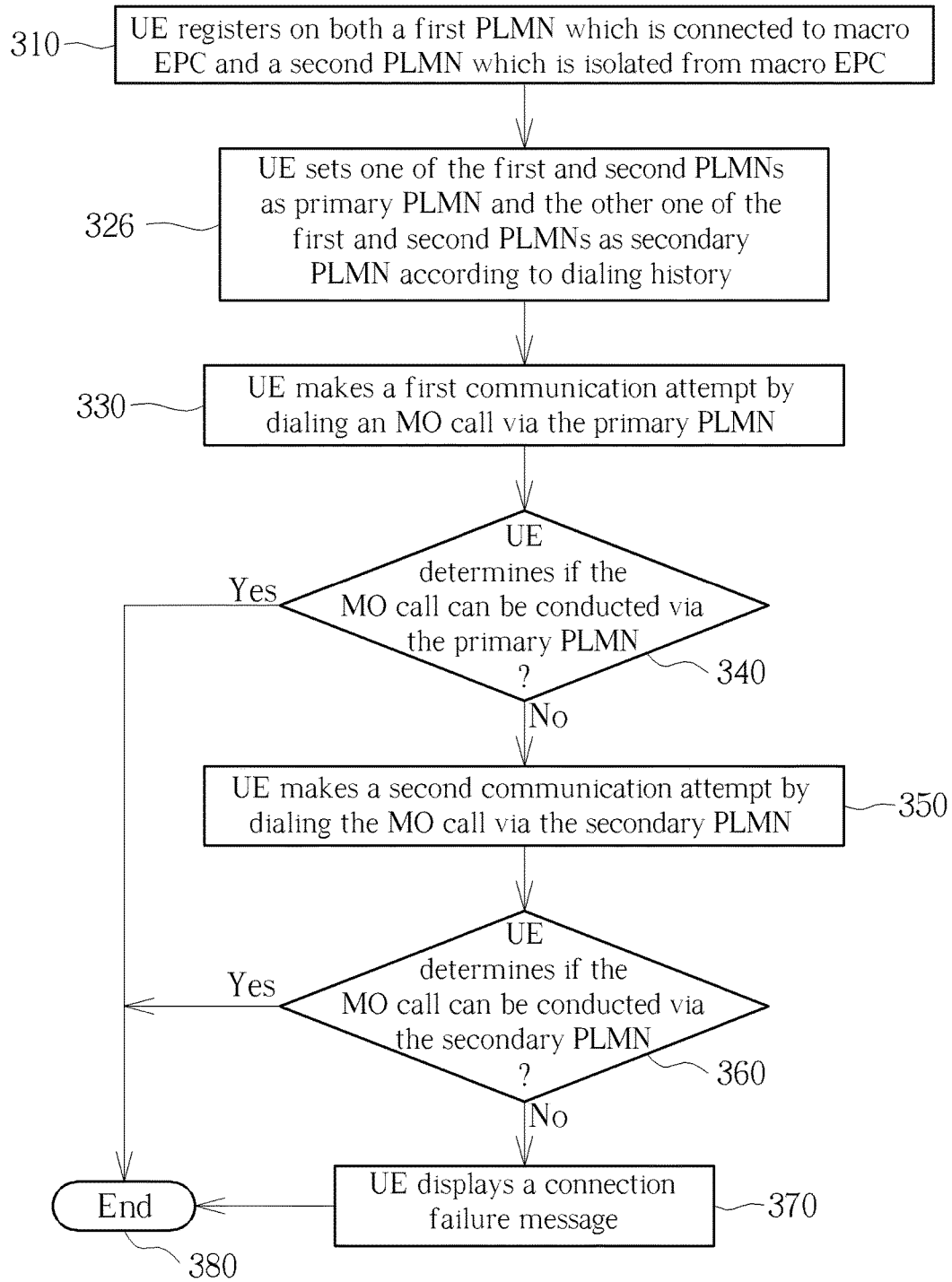
FIG. 5 is a flowchart illustrating a method of making an MO callusing a user equipment which operates in the IOPS dual PLMN mode according to another embodiment of the present invention.

FIG. 5 is a flowchart illustrating a method of making an MO callusing a user equipment which operates in the IOPS dual PLMN mode according to another embodiment of the present invention. The embodiment depicted in FIG. 5 includes the following steps:

Step 310: the user equipment registers on both a first PLMN which is connected to a macro EPC and a second PLMN which is isolated from the macro EPC; execute step 326.

Step 326: the user equipment sets one of the first and second PLMNs as a primary PLMN and the other one of the first and second PLMNs as a secondary PLMN according to a dialing history; execute step 330.

Step 330: the user equipment makes a first communication attempt by dialing an MO call via the primary PLMN; execute step 340.

Step 340: the user equipment determines if the MO call can be conducted via the primary PLMN; if yes, execute step 380; if no, execute step 350.

Step 350: the user equipment makes a second communication attempt by dialing the MO call via the secondary PLMN; execute step 360.

Step 360: the user equipment determines if the MO call can be conducted via the secondary PLMN; if yes, execute step 380; if no, execute step 370.

Step 370: the user equipment displays a connection failure message; execute step 380.

Step 380: end.

In the present invention, when operating in the IOPS dual PLMN mode, the user equipment is configured to register on both the first PLMN connected to a macro EPC and the second PLMN isolated from the macro EPC. All exemplary methods illustrated in FIGS. 3~5 include steps 310 and 330~380, but differ in the steps associated with setting the primary PLMN and the secondary PLMN (steps 320, 322, 324 and 326).

In step 310, the user equipment is configured to register on both the first PLMN and the second PLMN. In the present invention, the first PLMN may be a normal PLMN connected to the macro EPC which serves the user equipment in normal mode of operation, while the second PLMN may be an IOPS PLMN connected to a local EPC which provides a local IP connectivity and public safety services to the user equipment in IOPS mode of operation when the backhaul to the macro EPC is lost or not available. The method and decision associated with IOPS dual PLMN registration does not limit the scope of the present invention.

In the method depicted in FIG. 3, steps 320 and 322 are executed for setting the primary PLMN and the secondary PLMN. In step 320, the user equipment is configured to allow or request the user to enter the MO PLMN preference via the user interface. In an embodiment, an "MO PLMN preference" option may be included in the "Settings" menu of the user interface. For example, the user may find "MO PLMN preference" by sequentially tapping Settings→More→ . . . →Mobile Network→IOPS setting→MO PLMN preference, thereby selecting "normal mode" or "IOPS mode" as the MO PLMN preference. However, the method of providing the user interface for acquiring the MO PLMN preference does not limit the scope of the present invention.

In another embodiment, the user equipment may display the user interface, such as a pop-out window, every time when it enters the IOPS dual PLMN mode to request the user to enter the MO PLMN preference. In yet another embodiment, the user equipment may display the user interface, such as a pop-out window, every time when it receives an MO call request from the user for requesting the user to enter the PLMN preference. However, the method of providing the user interface for acquiring the MO PLMN preference does not limit the scope of the present invention.

In step 322, the user equipment may then set one of the first and the second PLMNs as the primary PLMN and the other one of the first and the second PLMNs as the secondary PLMN according to the MO PLMN preference acquired in step 320.

In the method depicted in FIG. 4, step 324 is executed for setting the primary PLMN and the secondary PLMN. In step 324, when receiving an MO call request from the user, the user equipment is configured to randomly set one of the first and second PLMNs as the primary PLMN and the other one of the first and second PLMNs as the secondary PLMN.

In the method depicted in FIG. 5, step 326 is executed for setting the primary PLMN and the secondary PLMN. In step 326, the user equipment is configured to set one of the first and second PLMNs as the primary PLMN and the other one of the first and second PLMNs as the secondary PLMN according to the dialing history of the user equipment. In one embodiment, the primary PLMN set according to the dialing history may be one of the first and second PLMNs which was used to make the last successful MO call. In another embodiment, the primary PLMN set according to the dialing history may be one of the first and second PLMNs which has been selected to make MO calls more frequently during a predetermined past period of time. In yet another embodiment, the primary PLMN set according to the dialing history may be one of the first and second PLMNs via which more successful MO calls have been conducted during a predetermined past period of time. However, the contents of the dialing history based on which the primary PLMN and the secondary PLMN are set do not limit the scope of the present invention.

In step 330, the user equipment is configured to make the first communication attempt by dialing the MO call via the primary PLMN. If it is determined that the MO call cannot be conducted via the primary PLMN in step 340, the user equipment is configured to make the second communication attempt by dialing the MO call via the secondary PLMN in step 350. If it is determined that the MO call cannot be conducted via the secondary PLMN in step 360, the user equipment is configured to display the connection failure message in step 370.

Figure 6:
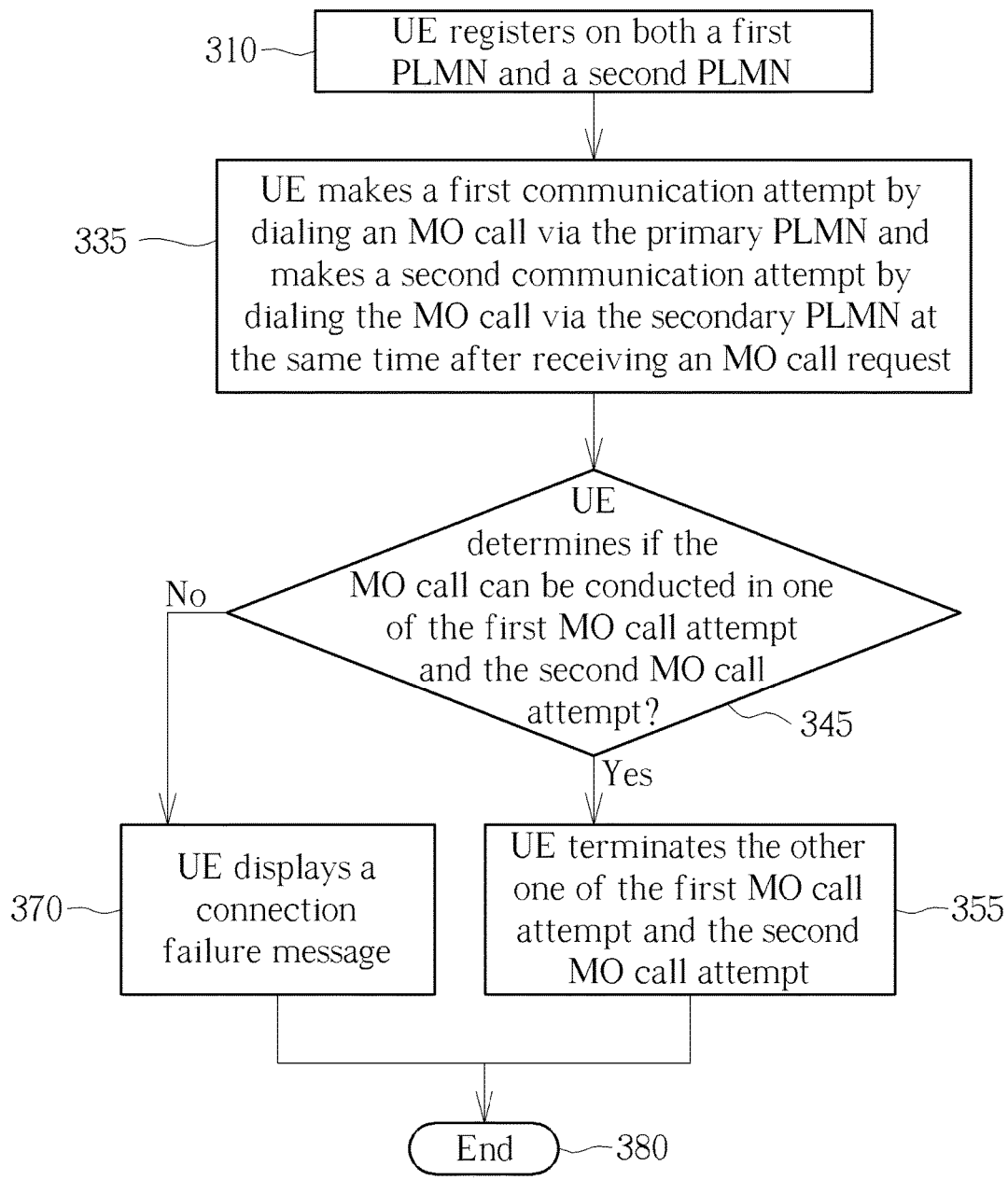
FIG. 6 is a flowchart illustrating a method of making an MO callusing a user equipment which operates in the IOPS dual PLMN mode according to another embodiment of the present invention.

FIG. 6 is a flowchart illustrating a method of making an MO callusing a user equipment which operates in the IOPS dual PLMN mode according to another embodiment of the present invention. The embodiment depicted in FIG. 6 includes the following steps:

Step 310: the user equipment registers on both a first PLMN which is connected to a macro EPC and a second PLMN which is isolated from the macro EPC; execute step 335.

Step 335: the user equipment makes a first communication attempt by dialing an MO call via the primary PLMN and makes a second communication attempt by dialing the MO call via the secondary PLMN at the same time after receiving an MO call request; execute step 345.

Step 345: the user equipment determines if the MO call can be conducted in one of the first MO call attempt and the second MO call attempt; if yes, execute step 355; if no, execute step 370.

Step 355: the user equipment terminates the other one of the first MO call attempt and the second MO call attempt; execute step 380.

Step 370: the user equipment displays a connection failure message; execute step 380.

Step 380: end.

The user equipment for implemented the method depicted in FIG. 6 may be a dual SIM dual active (DSDA) terminal in which a first smartcard may be used to listen to a first cell in the primary PLMN and a second smartcard may be used to listen to a second cell in the secondary PLMN simultaneously. In step 335 when receiving an MO call request, the user equipment may thus make the first MO call attempt via the primary PLMN and the second MO call attempt via the secondary PLMN at the same time. If it is determined in step 345 that the MO call can be conducted in one of the first MO call attempt and the second MO call attempt, the other one of the first MO call attempt and the second MO call attempt may be terminated in step 355. If it is determined in step 345 that the MO call cannot be conducted via any of first and secondary PLMNs, the user equipment is configured to display the connection failure message in step 370.

Figure 7:
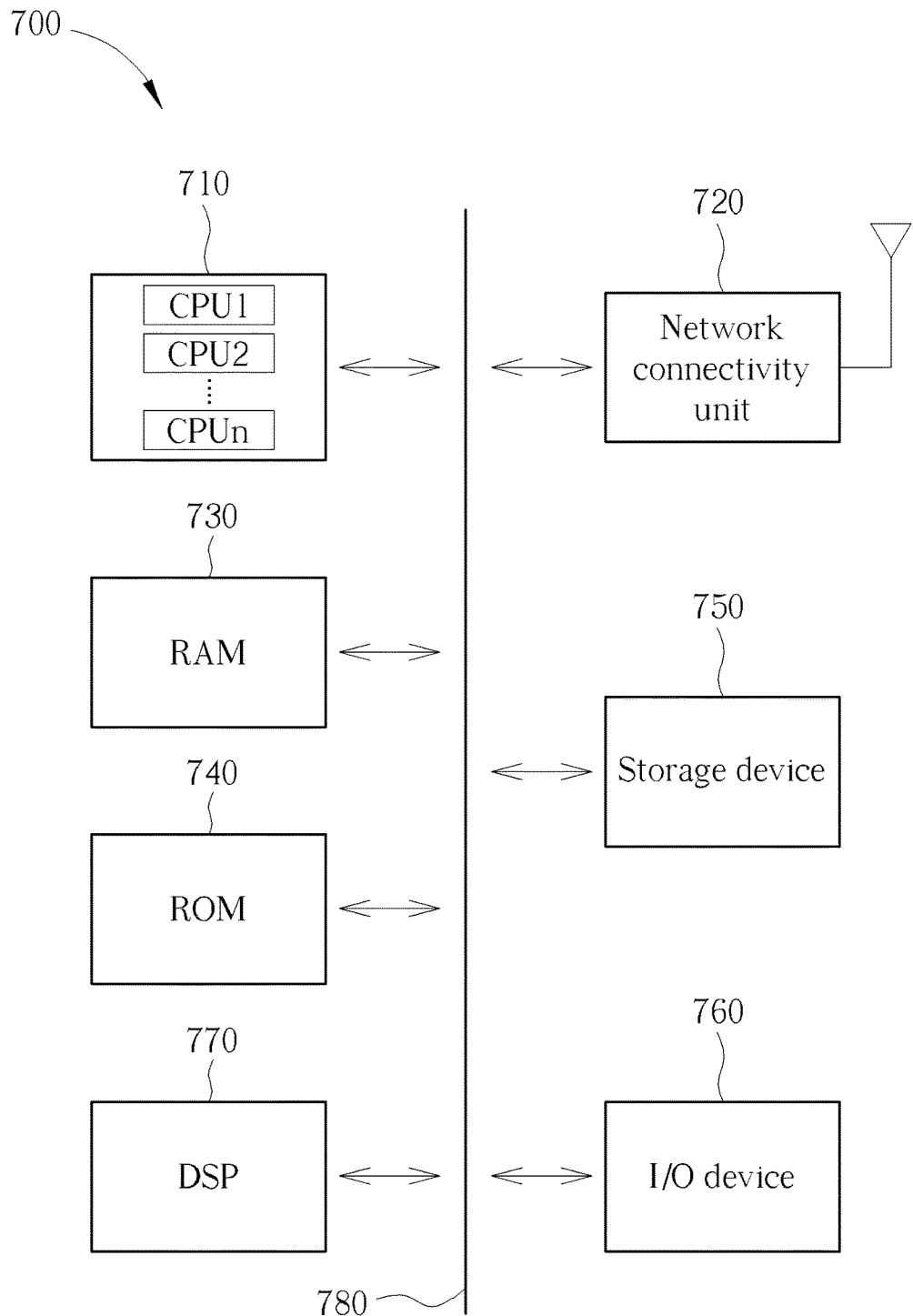
FIG. 7 is a functional diagram illustrating a system used in an IOPS-capable wireless communication system for carrying out the present method.

FIG. 7 is a functional diagram illustrating a system 700 which may be used in the user equipment for carrying out the present method. The system 700 includes a processing component 710, a network connectivity unit 720, random access memory (RAM) 730, read only memory (ROM) 740, a storage device 750, an input/output (I/O) device 760, and a digital signal processor (DSP) 770. These components might communicate with one another via a bus 780. In some cases, some of these components may not be present or may be combined in various combinations with one another or with other components not shown. These components might be located in a single physical entity or in more than one physical entity. Any actions described herein as being taken by the processing component 710 may be taken by the processing component 710 alone or by the processing component 710 in conjunction with one or more components shown or not shown in the drawing, such as with the DSP 770. Although the DSP 770 is shown as a separate component, the DSP 770 might be incorporated into the processing component 710.

The processing component 710 is configured to execute instructions, codes, computer programs, or scripts which may be accessed from the network connectivity units 720, RAM 730, ROM 740, or the storage device 750. In a hardware configuration, the processing component 710 may include one or multiple processors CPU1~CPUn for executing the present method simultaneously, serially, or otherwise by one processor. The one or multiple processors CPU1~CPUn may include one or more application specific integrated circuits (ASICs), DSPs, digital signal processing devices (DSPDs), programmable logic devices (PLDs), field programmable gate arrays (FPGAs), controllers, microcontrollers, microprocessors, or any combination of above. In a firmware or software configuration, software code may be stored in the RAM 730, the ROM 740 or the storage device 750 and executed by the processing component 710 for achieving the exemplary embodiments of the present invention.

The network connectivity unit 720 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, worldwide interoperability for microwave access (WiMAX) devices, and/or other well-known devices for connecting to the eNB. The network connectivity unit 720 allows the processing component 710 to communicate with the Internet or one or more telecommunications networks.

The RAM 730 may be used to store volatile data and instructions that are executed by the processing component 710. The ROM 740 may be used to store instructions and data that are read during execution of the instructions. The storage device 750 may include various disk-based systems such as hard disk, floppy disk, or optical disk and may be used to store programs that are loaded into the RAM 730 when such programs are selected for execution. Access to both the RAM 730 and the ROM 740 is typically faster than access to the storage device 750, but the storage device 750 can provide larger memory capacity The I/O devices 760 may include one or more of liquid crystal display (LCD) screens, touch screen displays, keyboards, keypads, switches, dials, mice, track balls, voice recognizers, card readers, paper tape readers, printers, video monitors, or other well-known input/output devices.

In the present invention, the user equipment may be any IOPS-capable transportable electronic device such as a mobile telephone, a personal digital assistant (PDA), a hand-held computer, a tablet, a nettop, a laptop computer, or any device with similar telecommunication capabilities. However, the type of the user equipment does not limit the scope of the present invention.

As well-known to those skilled in the art, the term "UE (user equipment" may be replaced with the terms "MS (mobile station), "SS (subscriber station)", "MSS (mobile subscriber station), "AMS (advanced mobile station)", mobile terminal, etc. Also, the term "eNB" may be replaced with the terms "BS (base station), "fixed station", "NB", "ABS (advanced base station), "AP (access point), etc.

In the present invention, when an IOPS-capable user equipment is registered on both a normal PLMN and an IOPS PLMN, the user equipment is configured to set one of the first PLMN and the second PLMN as a primary PLMN and the other one of the first PLMN and the second PLMN as a secondary PLMN randomly, according to an MO PLMN preference provided by a user of the user equipment, or according to a dialing history of the user equipment. Therefore, the present invention can provide PLMN precedence for the user equipment in the IOPS dual PLMN mode of operation to make MO calls.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of making a mobile-originated (MO) call using a user equipment in an isolated evolved universal terrestrial radio access network (E-UTRAN) operations for public safety (IOPS) dual public land mobile network (PLMN) mode of operation, the method comprising:
   the user equipment registering on both a first PLMN and a second PLMN, wherein the first PLMN is connected to a macro evolved packet core (EPC) and the second PLMN is isolated from the macro EPC;
   the user equipment setting one of the first PLMN and the second PLMN as a primary PLMN and an other one of the first PLMN and the second PLMN as a secondary PLMN according to a dialing history of the user equipment, wherein the primary PLMN is one of the first PLMN and the second PLMN which was used to make a last successful MO call, which has been selected to make MO calls more frequently during a predetermined past period of time, or via which more successful MO calls have been conducted during the predetermined past period of time; and
   the user equipment making a first communication attempt by dialing the MO call via the primary PLMN.

2. The method of claim 1, further comprising:
   the user equipment making a second communication attempt by dialing the MO call via the secondary PLMN after determining that the MO call cannot be conducted via the primary PLMN.

3. The method of claim 1, further comprising:
   the user equipment displaying a connection failure message after determining that the MO call cannot be conducted via the primary PLMN and the secondary PLMN.

* * * * *